Nov. 16, 1965  C. L. SMITH  3,217,564
REVERSIBLE DRIVE FOR POWER TOOLS
Filed Feb. 28, 1963
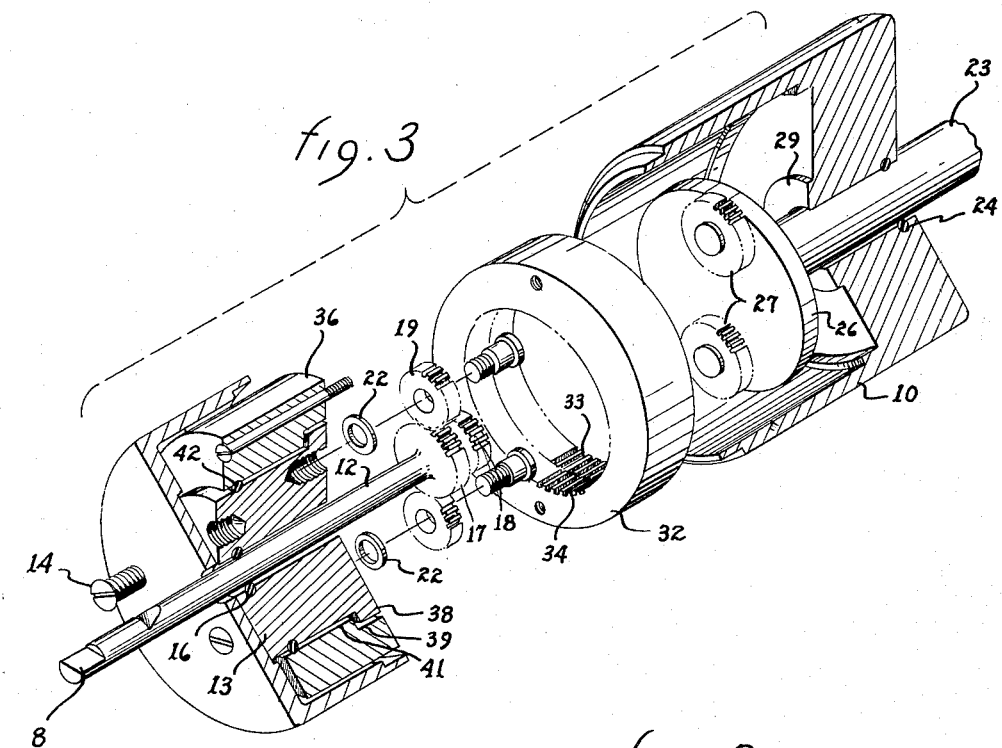
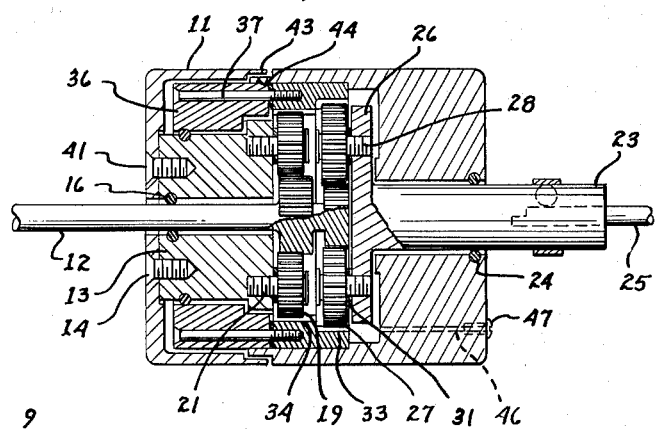
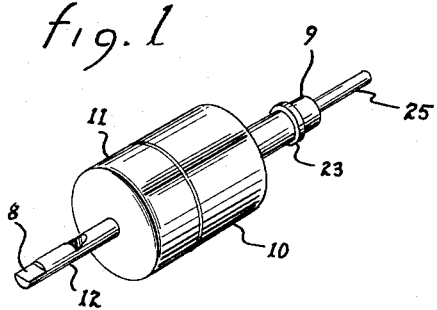
INVENTOR.
CHARLES L. SMITH
BY
John J. McLaughlin
ATTORNEY

United States Patent Office 3,217,564
Patented Nov. 16, 1965

3,217,564
REVERSIBLE DRIVE FOR POWER TOOLS
Charles L. Smith, 3339 E. Grant Road, Tucson, Ariz.
Filed Feb. 28, 1963, Ser. No. 261,699
16 Claims. (Cl. 74—764)

My invention relates to a reversible drive unit particularly adapted for use with a portable power tool. The present application is a continuation-in-part of my prior application, Serial No. 27,640, filed May 9, 1960, now Patent No. 3,165,947, granted Jan. 19, 1965.

The principal object of the invention is the provision of an improved readily reversible drive unit for power tools.

Another object is the provision of a simple reversible drive unit comprising a bi-part housing wherein the driven shaft will rotate in one direction when one part of the housing is held in the hand, and in the opposite direction when the other housing is held in the hand.

A further object of the invention is the provision of an improved rugged, but inexpensive, unit for forward or reverse drive of a hand-operated tool.

In the embodiment of the invention shown in the drawings:

FIG. 1 is a perspective view showing the complete unit with all of the parts in assembled relation;

FIG. 2 is an enlarged longitudinal sectional view, and

FIG. 3 is a further enlarged exploded view partially in section showing the details of construction of some of the parts.

Referring now to the drawings, the unit of the present invention comprises a housing having a forward portion 10 and a rear portion 11. An input shaft 12 is journaled in a block 13 secured to the rear housing portion by machine screws 14. The input shaft is shaped at 8 for engagement by the chuck of a small drill motor (not shown). An O-ring 16 forms a seal between the block 13 and the input shaft 12. Within the housing and integral with the input shaft 12 are a pair of driving gears 17 and 18. These gears, of course, are concentric with each other and concentric with the input shaft 12 which carries them. They also function as sun gears in a planetary gear system as will be explained. The input shaft 12 and the two gears 17 and 18 may be considered as a subassembly because they all turn as a unit, and as a unit are separable from the rest of the total assembly.

The block 13 has a plurality of planetary gears 19 secured to its inner face by means of cap screws 21. They are held slightly away from the face of the block 13 by spacing rings 22. The planetary gears 19 mesh with the driving gear 17. The rear housing portion 11, block 13 and planetary gears 19 may, however, be considered a separate subassembly as they are mounted together and function as a unit, even though they may not normally be separately removed as a unit from the total assembly.

An output shaft 23 is journaled in a thickened end of the forward housing portion 10 and an O-ring 24 acts as a seal. The output shaft 23 has an extension and clutch or chuck 9 for driving connection with the shank of a small hand tool 25. A face plate 26 secured to the output shaft carries a plurality of rotatably supported planetary gears 27 secured to the face plate by cap screws 28. A shallow annular projection 29 integral with the forward housing portion spaces the face plate 26 and prevents its binding against the housing. Spacing rings 31 between the planetary gears 27 and the face plate 26 also prevent binding of the planetary gears 27. As shown in FIG. 2, the planetary gears 27 mesh with the driving gear 18.

A relatively large ring member 32 is frictionally retained within the forward housing portion 10. Said ring member carries a pair of internal ring gears 33 and 34 with which the planetary gears 27 and 19 respectively mesh. An annular retainer 36 is secured to the ring 32 by a plurality of bolts 37. The block 13 has an annular radially projecting shoulder 38 engaging in a recess 39. The recess 39 leaves an inwardly projecting shoulder 41, and this shoulder engages behind the annular shoulder 38 on the block 13 to hold the entire unit in assembled relation. An O-ring 42 between block 13 and retainer 36 seals the bearing faces between these members.

A major diameter recessed projection 43 on the rear housing portion 11 and a reduced diameter projection 44 on the forward housing portion overlap in the manner shown in FIG. 2 to act as a seal. A suitable sealing ring (not shown) may be employed at this location. The housing may be substantially filled with lubricant or other means for lubricating the parts may be employed. A port 46 closed by a screw 47 may be employed to introduce light oil into the interior of the housing, if desired.

When the forward housing portion 10 is held stationary, the output shaft will rotate in the same direction as the input shaft 12; but when the rear housing portion 11 is held by the hand and the forward housing portion released, rotation of the output shaft 23 will be in the opposite direction. If the input shaft 12 turns in a clockwise direction, looking from rear to forward end thereof, the output shaft 23 will also be rotated in this same direction and can thus be operated for inserting a conventional right-hand thread screw; and when the rear housing portion 11 is held, the movement of the output shaft 23 will be in a direction to retract the screw. The tool 25 carried by the output shaft may, for example, be a screw driver, wrench, reamer or any small tool normally operated by the hand or with a portable motor drive.

Looking now further to the drawings, when the forward housing portion 10 is held stationary, the planetary gears 27 driven by the gear 18 will be caused to orbit around the ring gear 33 and also around the gear 18 as a sun gear. The orbiting of the planetary gears 27 causes the face plate 26 to be rotated with them and this, of course, carries the output shaft 23. Since the rear housing portion 11 is assumed not to be held, the planetary gears 19 will also orbit because of their contact with the ring gear 34. This movement, however, will be faster than in the case of the planetary gears 27 because of the gear ratios involved. This means that the forward speed of rotation of the output shaft may be slower than that of the input shaft, a desirable feature in many instances when a screw, bolt, nut or the like is being turned in a forward direction. It will be noted that the driving gear 18 is smaller than the driving gear 17, while the planetary gears 27 are larger than the planetary gears 19. The ring gear 33 is also larger than the ring gear 34.

When the rear housing member 11 is held stationary, the planetary gears cannot orbit because they are also held stationary because of the fact that they comprise a part of the subassembly which includes the rear housing member 11. Thus the ring gears 33 and 34 are driven in a reverse direction by rotation of the gears 19 on their axes, during which time they function as ordinary idler spur gears. The planetary gears 27, however, will at the same time be driven by gear 18. Since the gear ratio between the gear 17 and the ring gear 34 is less than the gear ratio between the gear 18 and the ring gear 33, the resulting reverse rotation of ring gears 33 and 34 will be at a higher speed than the simultaneous relative forward rotation of the face plate 26 and the output shaft 23. By this means, the higher speed reverse rotation of the ring gears 33 and 34 will carry planetary gears 27 and the face plate 26 with them in a reverse orbit and thus rotate the output shaft 23 in a reverse direction.

The reversible drive of the present invention is particularly adapted for driving small hand tools with a small drill motor. The unit is relatively inexpensively produced, and it is rugged in construction so that it will have a long useful life. The particular combination described and claimed hereinbelow has the big advantage that various speed differentials between the input shaft and output shaft are readily obtainable, in either a forward or reverse direction. The reverse rotation of the output shaft may be controlled to be faster or slower than its forward rotation. The particular gear ratios selected is determined for the most part by the principal use to which the drive will be put. When the unit is employed to fasten and unfasten, attach or detach or tighten and untighten small parts such as screws, bolts and the like, there is normally a definite advantage in having a faster reverse speed than forward speed in most cases.

It should be obvious to those skilled in the art that many combinations of gear ratios may be employed in the present invention to vary the drive or speed ratio between the input shaft and output shaft. The relative speeds of rotation on forward and reverse drive may also be varied, with the forward and reverse output shaft drive at the same speed, or either faster or slower on forward drive. The two driving gears 17 and 18 may be thought of as one, as they may have the same diameter; and this is true also, of the two internal ring gears 33 and 34. Many variations in the relative sizes of the two planetary gears 19 and 27 are also possible. For example, the gears 19 and 27 may be the same size, and a variation in gear ratios by merely making the driving gear 18 smaller and/or larger than gear 17; or ring gear 33 smaller and/or larger than ring gear 34. Finally, while I prefer that the output shaft rotate forwardly when the forward housing portion is held stationary, and in a reverse direction when the rear housing member is held stationary. This relationship may be reversed without departing from the present invention.

I have shown and described a preferred embodiment of my invention, including detailed features of construction thereof, but the invention is not limited by such details as shown and described but only by the scope of the appended claims.

I claim:
1. A reversing drive unit comprising
  (a) a housing having forward and rear portions,
  (b) an input shaft journaled in said rear housing portion, said input shaft shaped to be engaged by a chuck of a small drill motor (not shown),
  (c) a driving gear within the housing integral with the input shaft,
  (d) a planetary gear carried by the rear housing and meshing with the driving gear,
  (e) an output shaft aligned with the input shaft and journaled in the forward housing, said output shaft having means for driving engagement of the shank of a small hand tool or the like,
  (f) a face plate within the housing carried by the output shaft,
  (g) a ring gear carried by the forward housing portion,
  (h) means, including at least one planetary gear carried by said face plate and said planetary gear carried by the rear housing portion, causing said output shaft to be rotated in one direction when the forward housing portion is held stationary, and in a reverse direction when the rear housing portion is held stationary, and
  (i) retaining means secured to the forward housing portion providing support and bearing means for the rear housing portion.
2. A reversing drive unit comprising
  (a) a housing having forward and rear portions,
  (b) an input shaft journaled in said rear housing portion, said input shaft shaped to be engaged by a chuck of a small drill motor (not shown),
  (c) a driving gear within the housing integral with the input shaft,
  (d) a planetary gear carried by the rear housing and meshing with the driving gear,
  (e) an output shaft aligned with the input shaft and journaled in the forward housing, said output shaft having means for driving engagement of the shank of a small hand tool or the like,
  (f) a face plate within the housing carried by the output shaft,
  (g) a ring gear carried by the forward housing portion,
  (h) means, including at least one planetary gear carried by said face plate and said planetary gear carried by the rear housing portion, causing said output shaft to be rotated in the same direction as the input shaft when the forward housing portion is held stationary, and in a reverse direction when the rear housing portion is held stationary, and
  (i) retaining means secured to the forward housing portion providing support and bearing means for the rear housing portion.
3. A reversing drive unit comprising
  (a) a housing having forward and rear portions,
  (b) an input shaft journaled in said rear housing portion, said input shaft shaped to be engaged by a chuck of a small drill motor (not shown),
  (c) a pair of driving gears within the housing integral with the input shaft,
  (d) a planetary gear carried by the rear housing and meshing with one driving gear,
  (e) an output shaft aligned with the input shaft and journaled in the forward housing, said output shaft having means providing a driving engagement on the shank for a small hand tool or the like,
  (f) a face plate within the housing carried by the output shaft,
  (g) a planetary gear carried by said face plate and meshing with the other driving gear,
  (h) a pair of ring gears carried by the forward housing portion,
  (i) said planetary gears meshing with said pair of ring gears, and
  (j) the gear ratio between the driving gear and ring gear engaging one planetary gear being less than the gear ratio between the driving gear and ring gear through the second planetary gear, whereby when said forward housing portion is held stationary said planetary gears are caused to orbit around the ring gear and rotate the face plate and output shaft in one direction, and when the rear housing portion is held stationary, the said planetary gears are caused to orbit in an opposite direction and rotate the face plate and output shaft in an opposite direction,
  (k) retaining means secured to the forward housing portion providing support and bearing means for the rear housing portion.
4. A reversing drive unit comprising
  (a) a housing having forward and rear portions,
  (b) an input shaft journaled in said rear housing portion, said input shaft shaped to be engaged by a chuck of a small drill motor (not shown),
  (c) a driving gear within the housing integral with the input shaft,
  (d) an internal ring gear carried by the forward housing portion,
  (e) an output shaft journaled in said forward housing portion,
  (f) a face plate carried by the output shaft within the housing,

(g) a planetary gear carried by the rear housing portion and meshing with both said driving gear and ring gear, (h) a planetary gear carried by said face plate and meshing with both said driving gear and said ring gear, and (i) retaining means secured to the forward housing portion providing support and bearing means for the rear housing portion.

5. A reversing drive unit as defined in claim 1, wherein said driving gear comprises two portions of different dimeter, said two portions meshing with said first mentioned and second mentioned planetary gears respectively.

6. A reversing drive mechanism as defined in claim 1, wherein said ring gear comprises two portions of different diameter, said two portions meshing with said first mentioned and second mentioned planetary gears respectively.

7. A reversing drive mechanism as defined in claim 1 wherein both said driving gear and ring gear have portions of different diameter engaged by said two planetary gears to provide two planetary systems with different gear ratios.

8. A reversing drive unit comprising (a) a housing having forward and rear portions, such housing portions having end walls and annular side walls, (b) a block secured to said end wall of the rear housing portion so as to become functionally a part thereof, said block separated from the annular side wall to thereby form an annular space in said rear housing portion, (c) an annular radial outwardly extending projection on said block forming a shoulder projecting into said space, (d) an input shaft journaled in said block, said input shaft shaped to be engaged by a chuck of a small drill motor, (e) a driving gear carried by the input shaft within the housing, (f) an output shaft journaled in the end portion of said forward housing portion, said output shaft having a chuck for driven engagement of the shank of a small hand tool or the like, (g) a face plate on the output shaft within the housing, (h) a ring member secured within the forward housing portion with an internal ring gear forming a part thereof, (i) an annular retainer secured to said ring and projecting into said annular space, (j) an annular inwardly extending projection engaging within said annular space behind said shoulder on the block and forming a recess to receive the shoulder on said block, to thus hold said housing portions in relatively rotatable assembled relation, (k) a planetary gear carried by said block in meshing relation with said driving gear and said ring gear, and (l) a planetary gear carried by said face plate in meshing relation with said driving gear and said ring.

9. A reversing drive unit comprising (a) a housing having forward and rear portions, such housing portion having end walls and side walls, (b) a block secured to said end wall of the rear housing portion so as to become functionally a part thereof, said block separated from the annular side wall to thereby form an annular space in said rear housing portion, (c) an annular radial outwardly extending projection on said block forming a shoulder projecting into said space, (d) an input shaft journaled in said block, said input shaft shaped to be engaged by a chuck of a small drill motor (not shown), (e) a pair of driving gears carried by the input shaft within the housing, (f) an output shaft journaled in the end portion of said forward housing portion, said output shaft having a chuck for driven engagement of the shank of a small hand tool or the like, (g) a face plate on the output shaft within the housing, (h) a ring member secured within the forward housing portion with a pair of internal ring gears forming a part thereof, (i) an annular retainer secured to said ring and projecting into said annular space, (j) an annular inwardly extending projection engaging within said annular space behind said shoulder on the block and forming a recess to receive the shoulder on said block, to thus hold said housing portions in relatively rotatable assembled relation, (k) a planetary gear carried by said block in meshing relation with one driving gear and one ring gear, (l) a planetary gear carried by said face plate in meshing relation with the other driving gear and the other ring gear, and (m) the gear ratios between the driving gear, one planetary gear and the ring gear being different from the gear ratio between the driving gear, second planetary gear and ring gear.

10. A reversing drive unit comprising (a) a housing having forward and rear portions, such housing portions having end walls and annular side walls, (b) a block secured to said end wall of the rear housing portion so as to become functionally a part thereof, said block separated from the annular side wall to thereby form an annular space in said rear housing portion, (c) an annular radial outwardly extending projection on said block forming a shoulder projecting into said space, (d) an input shaft journaled in said block, said input shaft shaped to be engaged by a chuck of a small drill motor (not shown), (e) a two-part driving gear carried by the input shaft, within the housing, each part having a different diameter, (f) an output shaft journaled in the end portion of said forward housing portion, said output shaft having a chuck for driven engagement of the shank of a small hand tool or the like, (g) a face plate on the output shaft within the housing, (h) a ring member secured within the forward housing portion with a pair of integral ring gears of different diameters, (i) an annular retainer secured to said ring gear and projecting into said annular space, (j) an annular inwardly extending projection engaging within said annular space behind said shoulder on the block and forming a recess to receive the shoulder on said block, to thus hold said housing portions in relatively rotatable assembled relation, (k) said block journaled in said inwardly extending projection, (l) a planetary gear carried by the block in meshing relation with one part of said driving gear and with one of said ring gears, and (m) a planetary gear of a different size than said first mentioned planetary gear in meshing relation with a second part of the driving gear and with the other ring gear.

11. A reversing drive unit comprising (a) a housing having forward and rear portions, such housing portions having end walls, (b) a block secured to said end wall of the rear housing portion so as to become functionally a part thereof, said block separated from the annular side wall to thereby form an annular space in said rear housing portion, (c) an annular radial outwardly extending projection on said block forming a shoulder projecting into said space, (d) an input shaft journaled in said block, said input shaft shaped to be engaged by a chuck of a small drill motor (not shown), (e) a relatively larger and relatively smaller driving gear integral with the input shaft and disposed within the housing, said smaller driving gear disposed forwardly of the larger driving gear, (f) an output shaft journaled in the end portion of said forward housing portion, said output shaft having a chuck for driven engagement of the shank of a small hand tool or the like, (g) a face plate on the output shaft within the housing, (h) a ring member secured within the forward housing portion with a larger diameter internal ring gear aligned with the smaller diameter driving gear and a smaller diameter internal ring gear aligned with the larger diameter driving gear, (i) an annular retainer secured to said ring gear and projecting into said annular space, (j) an annular inwardly extending projection engaging within said annular space behind said shoulder on the block and forming a recess to receive the shoulder on said block, to thus hold said housing portions in relatively rotatable assembled relation, (k) said block journaled in said inwardly extending projection, (l) a planetary gear carried by said blocks in meshing relation with the larger driving gear and smaller ring gear, and (m) a planetary gear carried by the face plate in meshing relation with the smaller driving gear and larger ring gear.

12. A reversing drive unit comprising (a) a housing having forward and rear portions, such housing portions having end walls, (b) a block secured to said end wall of the rear housing portion so as to become functionally a part thereof, said block separated from the annular side wall to thereby form an annular space in said rear housing portion, (c) an annular radial outwardly extending projection on said block forming a shoulder projecting into said space, (d) an input shaft journaled in said block, said input shaft shaped to be engaged by a chuck of a small drill motor (not shown), (e) a relatively larger and relatively smaller driving gear integral with the input shaft and disposed within the housing, said smaller driving gear disposed forwardly of the larger driving gear, (f) an output shaft journaled in the end portion of said forward housing portion, said output shaft having a chuck for driven engagement of the shank of a small hand tool or the like, (g) a face plate on the output shaft within the housing, (h) a ring member secured within the forward housing portion with a larger diameter internal ring gear aligned with the smaller diameter driving gear and a smaller diameter internal ring gear aligned with the larger diameter driving gear, (i) an annular retainer secured to said ring gear and projecting into said annular space, (j) an annular inwardly extending projection engaging within said annular space behind said shoulder on the block and forming a recess to receive the shoulder on said block, to thus hold said housing portions in relatively rotatable assembled relation, (k) said block journaled in said projection, (l) a planetary gear carried by said blocks in meshing relation with the larger driving gear and smaller ring gear, and (m) a planetary gear larger than said first mentioned planetary gear carried by the face plate in meshing relation with the smaller driving gear and larger ring gear.

13. A reversing drive unit as defined in claim 2 wherein said driving gear comprises two portions of different diameter, said two portions meshing with said first mentioned and second mentioned planetary gears respectively.

14. A reversing drive merhanism as defined in claim 2 wherein said ring gear comprises two portions of different diameter, said two portions meshing with said first mentioned and second mentioned planetary gears respectively.

15. A reversing drive mechanism as defined in claim 2 wherein both said driving gear and ring gear have portions of different diameter engaged by two said planetary gears to provide two planetary systems with different gear ratios.

16. A reversible drive unit comprising (a) a housing having forward and rear portions, (b) an input shaft journaled in the rear housing portion, (c) a first and second part driving gear within said housing integral with said input shaft, (d) an internal ring gear integrally carried by the forward housing portion, (e) an output shaft co-axial with said input shaft and journaled in said forward housing portion, (f) a face plate integrally carried by said output shaft within said housing, (g) a first planetary gear carried by said face plate and meshing with said first part of said driving gear and said ring gear, (h) a second planetary gear carried by said rear housing portion and meshing with said second part of said driving gear and said ring gear, (i) a gear ratio between the first part of said driving gear and the ring gear meshing with said first planetary gear being different from the gear ratio between the second part of said driving gear and the ring gear meshing with said second planetary gear, (j) whereby when the forward housing portion is held stationary, rotation of said input shaft will rotate said output shaft in one direction, and when said rear housing portion is held rotation of said input shaft will rotate said output shaft in the opposite direction, and (k) retaining means secured to said forward housing portion providing support and bearing means for said rear housing portion.

References Cited by the Examiner
UNITED STATES PATENTS 2,941,420  6/1960  Graybill _____ 74—764

DON A. WHITE, *Primary Examiner.*